(12) United States Patent
Sandhu et al.

(10) Patent No.: US 10,124,769 B2
(45) Date of Patent: Nov. 13, 2018

(54) GLOBAL STOLEN VEHICLES TRACKING

(71) Applicant: FORD GLOBAL TECHNOLOGIES, LLC, Dearborn, MI (US)

(72) Inventors: Harminder Sandhu, Northville, MI (US); David Marvin Gersabeck, Commerce Township, MI (US); Derek Louis Porter, Sr., Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/415,148

(22) Filed: Jan. 25, 2017

(65) Prior Publication Data

US 2018/0208156 A1  Jul. 26, 2018

(51) Int. Cl.
| | |
|---|---|
| G08G 1/123 | (2006.01) |
| B60R 25/33 | (2013.01) |
| H04B 1/3816 | (2015.01) |
| H04L 29/08 | (2006.01) |
| H04W 4/04 | (2009.01) |

(52) U.S. Cl.
CPC ........... B60R 25/33 (2013.01); H04B 1/3816 (2013.01); H04L 67/12 (2013.01); H04W 4/046 (2013.01)

(58) Field of Classification Search
CPC ...... B60R 25/33; B60R 25/102; H04B 1/3816
USPC ..... 340/993, 988, 989, 539.13, 539.22, 933, 340/935
See application file for complete search history.

(56) References Cited

U.S. PATENT DOCUMENTS

| | | | | |
|---|---|---|---|---|
| 4,908,629 | A  * | 3/1990 | Apsell | G01S 5/02 340/426.15 |
| 8,892,132 | B2 | 11/2014 | Monks et al. | |
| 9,147,344 | B2 | 9/2015 | Nagy et al. | |
| 2008/0012731 | A1 * | 1/2008 | Krippgans | B60R 25/04 340/989 |
| 2011/0103360 | A1 * | 5/2011 | Ku | G01S 5/0252 370/338 |
| 2011/0215949 | A1 * | 9/2011 | Yarnold | G08G 1/205 340/989 |
| 2013/0214917 | A1 * | 8/2013 | Chung | B60R 25/102 340/426.19 |
| 2016/0260324 | A1 | 9/2016 | Tummala et al. | |
| 2017/0015278 | A1 * | 1/2017 | Yap | B60R 25/102 |

* cited by examiner

*Primary Examiner* — Tai T Nguyen
(74) *Attorney, Agent, or Firm* — Jennifer M. Stec; Brooks Kushman P.C.

(57) ABSTRACT

A vehicle information server maps a unique identifier of a stolen vehicle to a network identifier of the vehicle. Responsive to receiving the network identifier of the stolen vehicle and identifying access of the network identifier to a component of the network, a service provider server of a service provider network indicates a physical location of the component and a time of access of the component to a vehicle theft system.

19 Claims, 3 Drawing Sheets

(12) United States Patent US 10,124,769 B2

GLOBAL STOLEN VEHICLES TRACKING

TECHNICAL FIELD

Aspects of the disclosure generally relate to systems and method for globally tracking stolen vehicles.

BACKGROUND

Vehicle theft is an issue in the United States and around the world. Many anti-theft technologies focus on preventing a theft from occurring. However, there are few options for the tracking of stolen vehicles within the United States, let alone around the world. Once stolen, many vehicles are exported or stripped for parts before they can be located.

SUMMARY

In one or more illustrative embodiments, a system includes a vehicle information server mapping a unique identifier of a stolen vehicle to a network identifier of the vehicle; and a service provider server of a service provider network, programmed to, responsive to receiving the network identifier and identifying access of the network identifier to a component of the network, indicate a physical location of the component and a time of access of the vehicle to the component.

In one or more illustrative embodiments, a method includes responsive to receiving a message from a vehicle theft system, initiating monitoring for a network identifier mapped by a vehicle information server from a unique vehicle identifier of a stolen vehicle; identifying access of the network identifier to a component of the network; and utilizing a mapping of network locations to physical locations to translate a network location of the component to the physical location of the component.

In one or more illustrative embodiments, a non-transitory computer-readable medium comprising instructions that, when executed by a processor, cause the processor to receive an indication including a unique vehicle identifier from a vehicle theft system, the indication specifying that a stolen vehicle corresponding to the unique vehicle identifier is to be monitored; map the unique vehicle identifier to one or more network identifiers using a vehicle information server storing an association of unique identifiers of vehicles to network identifiers of vehicles; identify one or more of the network identifiers as having accessed a communications network; and utilize a mapping of network locations to physical locations to translate network locations of the network accesses to physical locations of the stolen vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
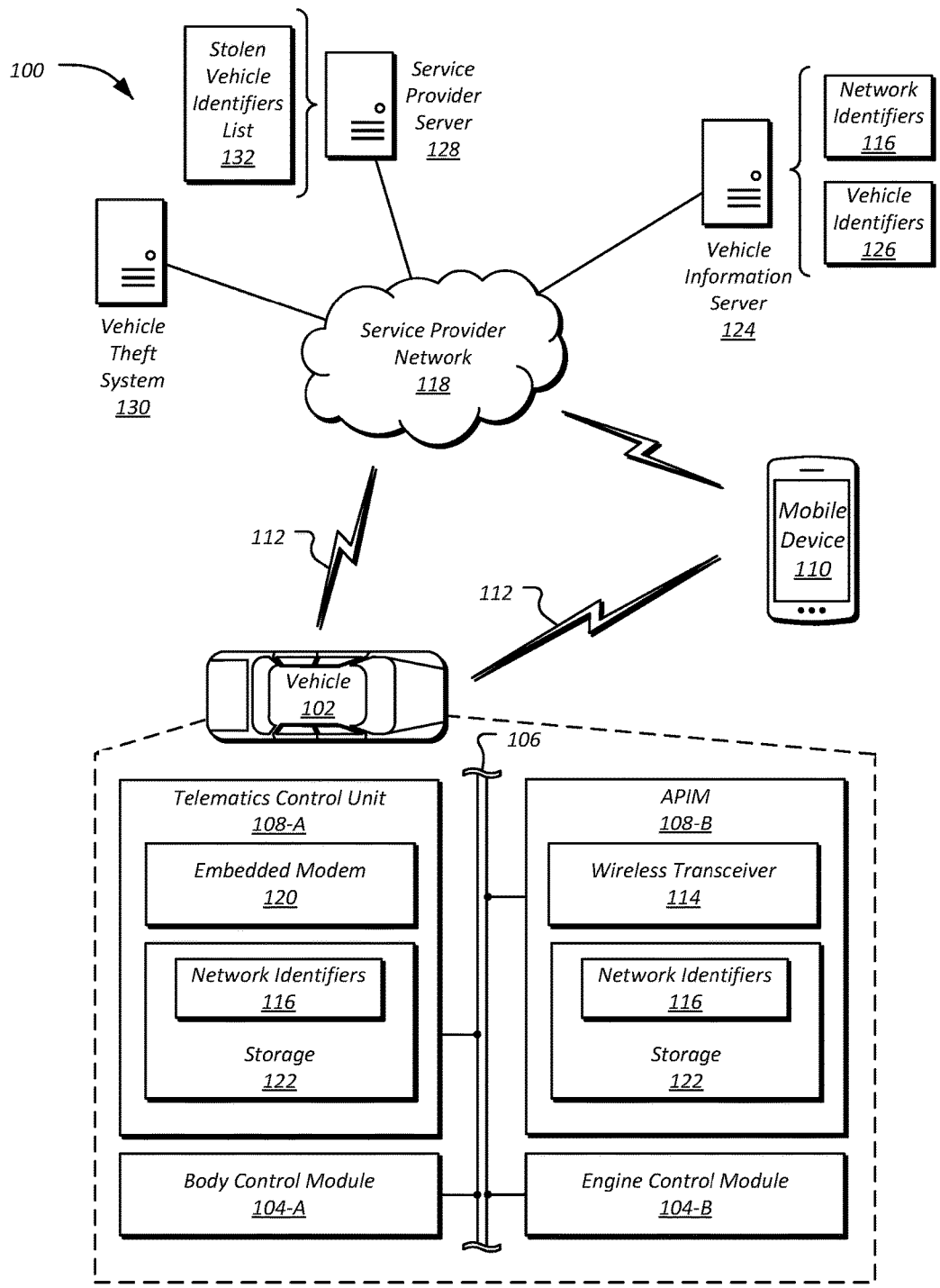
FIG. 1 illustrates an example system for tracking stolen vehicles according to network identifiers and vehicle identifiers.

FIG. 1 illustrates an example system 100 for tracking stolen vehicles 102 according to network identifiers 116 and vehicle identifiers 126. The system includes a vehicle 102 having communications components 108 such as a telematics control unit (TCU) 108-A and an accessory protocol interface module (APIM) 108-B. The telematics control unit 108-A may utilize an embedded modem 120 to communicate over a service provider network 118. The accessory protocol interface module (APIM) 108-B may utilize a local area connection with a mobile device 110 to communicate over the service provider network 118. A vehicle information server 124 may be configured to maintain vehicle 102 build information, such as association of the network identifiers 116 to vehicle identifiers 126 (e.g., VIN) of vehicles 102 that connect to the service provider network 118. When a vehicle 102 is reported stolen (e.g., according to vehicle identifier 126), the vehicle information server 124 provides the network identifiers 116 of the stolen vehicle 102 to the service provider server 128. Then, if the stolen vehicle 102 is seen by the service provider server 128 attached to the service provider network 118, the location of the stolen vehicle 102 may be identified. While an example system 100 is shown in FIG. 1, the example components as illustrated are not intended to be limiting. Indeed, the system 100 may have more or fewer components, and additional or alternative components and/or implementations may be used. As an example, some or all of the operations of the vehicle information server 124 and the vehicle theft system 130 may be combined in some embodiments.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV).

The vehicle 102 may include a plurality of electronic control units (ECUs) configured to perform and manage various vehicle 102 functions under the power of the vehicle battery and/or drivetrain. As depicted, the example vehicle ECUs are represented as discrete components. However, the vehicle ECUs may share physical hardware, firmware, and/or software, such that the functionality from multiple ECUs may be integrated into a single ECU. Or, the functionality of various such ECUs may be distributed across a plurality of ECUs.

As shown, one ECU may be a body controller 104-A configured to manage various power control functions such as exterior lighting, interior lighting, keyless entry, remote start, and point of access status verification. Another ECU may be an engine controller 104-B configured to provide control of engine operating components. It should be noted that these are merely examples, and more, fewer, and different ECUs may be included in a given vehicle 102. For instance, the vehicle 102 may additionally or alternately include a transmission control ECU to utilize sensor data and data from the engine controller 104-B to calculate how and when to change gears in the vehicle 102 for optimum performance, fuel economy and shift quality; a climate control management ECU to provide control of heating and cooling system components (e.g., compressor clutch, blower fan, temperature sensors, etc.), and a global positioning system (GPS) ECU to provide vehicle location information.

The vehicle bus 106 may include various methods of communication available between the vehicle ECUs 104. The vehicle bus 106 may also support communication between the telematics control unit 108A and the vehicle ECUs 104. As some non-limiting examples, the vehicle bus 106 may include one or more of a vehicle controller area network (CAN), an Ethernet network, and a media oriented system transfer (MOST) network. It should be noted that the illustrated bus topology is merely an example, and other numbers and arrangements of vehicle buses 106 may be used.

The communications components 108 may include an accessory protocol interface module (APIM) 108-B and a telematics control unit 108-A. The APIM 108-B may be configured to support voice command and local area connection to mobile device 110, receive user input via various buttons or other controls, and provide vehicle status information to a driver or other vehicle 102 occupants. An example APIM 108-B may be the SYNC system provided by FORD MOTOR COMPANY of Dearborn, Mich.

The APIM 108-B may be configured to communicate with mobile devices 110 of the vehicle occupants. The mobile devices 110 may be any of various types of portable computing device, such as cellular phones, tablet computers, smart watches, laptop computers, portable music players, or other devices capable of communication with the APIM 108-B.

The APIM 108-B may be configured to communicate over a transport connection 112 with the mobile device 110. The transport connection 112 may be a data connection between the APIM 108-B and the mobile device 110. In many examples, the APIM 108-B may include a wireless transceiver 114 (e.g., a BLUETOOTH controller, a ZigBee® transceiver, a Wi-Fi transceiver, etc.) configured to communicate with a compatible wireless transceiver of the mobile device 110. Additionally or alternatively, the APIM 108-B may communicate with the mobile device 110 over a wired transport connection (not shown), such as via a USB connection between the mobile device 110 and a USB subsystem of the APIM 108-B.

The APIM 108-B may be assigned or otherwise associated with one or more predefined network identifiers 116 to facilitate communication of the APIM 108-B with the mobile devices 110. In an example, the wireless transceiver 114 may have a media access control (MAC) address network identifier 116 that serves to uniquely identify the wireless transceiver 114 to the mobile devices 110. Using the MAC address, Wi-Fi or packets that are sent from the APIM 108-B are addressed as coming from the MAC address and Wi-Fi or other packets that are intended to be delivered to the APIM 108-B are addressed with the MAC address of the APIM 108-B as a destination address. Using the transport connection 112 to the mobile device 110, the APIM 108-B may be able to access the service provider network 118. The service provider network 118 may include one or more interconnected communication networks such as the Internet, a cellular telephone network, a satellite link network, a local area network, or a wide area network, as some non-limiting examples.

The TCU 108A may be configured to communicate over a transport connection 112 between the vehicle 102 and the service provider network 118, without use of the mobile device 110. In many examples, the TCU 108-A may include or be in communication with an embedded modem 120 configured to communicate wirelessly with the service provider network 118. The embedded modem 120 of the TCU 108-A may have an integrated circuit card identifier (ICCID) that uniquely identifies a subscriber identity module (SIM) of the TCU 108-A. The SIM may be inserted into a SIM card slot of the embedded modem 120 or may be hard-wired to the embedded modem 120. The ICCID may be referred to as a serial number of the embedded modem 120, and may be used to uniquely identify the embedded modem 120 over the service provider network 118.

The communications components 108 may store the network identifiers 116 of the communications components 108 in computer-readable storage 122. A computer-readable storage medium 122 (also referred to as a processor-readable medium or storage 122) includes any non-transitory (e.g., tangible) medium that participates in providing data (e.g., instructions) that may be read by a computer. For instance, the APIM 108-B may store the MAC address network identifier 116 in a storage 122 of the APIM 108-B, and the TCU 108-A may store the ICCID network identifier 116 in a storage 122 of the TCU 108-A.

The vehicle information server 124 may be configured to maintain vehicle 102 build information, such as association of the network identifiers 116 to vehicle identifiers 126 (e.g., VIN) of vehicles 102 that connect to the service provider network 118. In an example, the vehicle information server 124 may receive associations of the network identifiers 116 to the vehicle identifiers 126 from a manufacturer of the vehicle 102 in relation to the build process for the vehicle 102. In another example, the vehicle 102 may be configured to send the network identifiers 116 and its vehicle identifier 126 to the vehicle information server 124, e.g., over a transport connection 112 from the vehicle 102 to vehicle information server 124 via the service provider network 118.

These associations of vehicle identifiers 126 to network identifiers 116 may be maintained by the vehicle information server 124 in a data store. The data store may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

The service provider server 128 may be configured to manage communications over the service provider network 118. In an example, the service provider server 128 may be configured to monitor devices connected to the service provider network 118 (e.g., mobile devices 110, embedded modems 120, etc.) to ensure that the connected devices are authorized to utilize the communications services of the service provider network 118. In an example, the service provider server 128 may authorize the devices according to network identifiers 116 such as ICCID and/or MAC address. The service provider server 128 may be further configured to log or otherwise monitor usage of the services of the service provider network 118. The monitoring may be done, for example, to ensure that connected devices utilize services that they are authorized to use, to facilitate billing for services that are used, and/or to identify network congestion or overload situations. In an example, the service provider server 128 may maintain a stolen vehicle identifiers list 132 of network identifiers 116 of stolen vehicles 102 to monitor for.

The vehicle theft system 130 may be configured to receive indications of vehicles 102 that have been stolen. In an example, when a vehicle theft is reported to law enforcement, law enforcement may provide the vehicle identifier 126 to the vehicle theft system 130. In another example, the vehicle theft system 130 may receive an indication of a vehicle 102 having been stolen from the vehicle 102 owner (e.g., calling or otherwise sending a message to the vehicle theft system 130). Responsive to receiving the indication of the stolen vehicle 102, the vehicle theft system 130 may be configured to perform actions to aid in the recovery of the vehicle 102. Further aspects of the operation of the vehicle theft system 130 and other system 100 elements are described in detail below.

Figure 2:
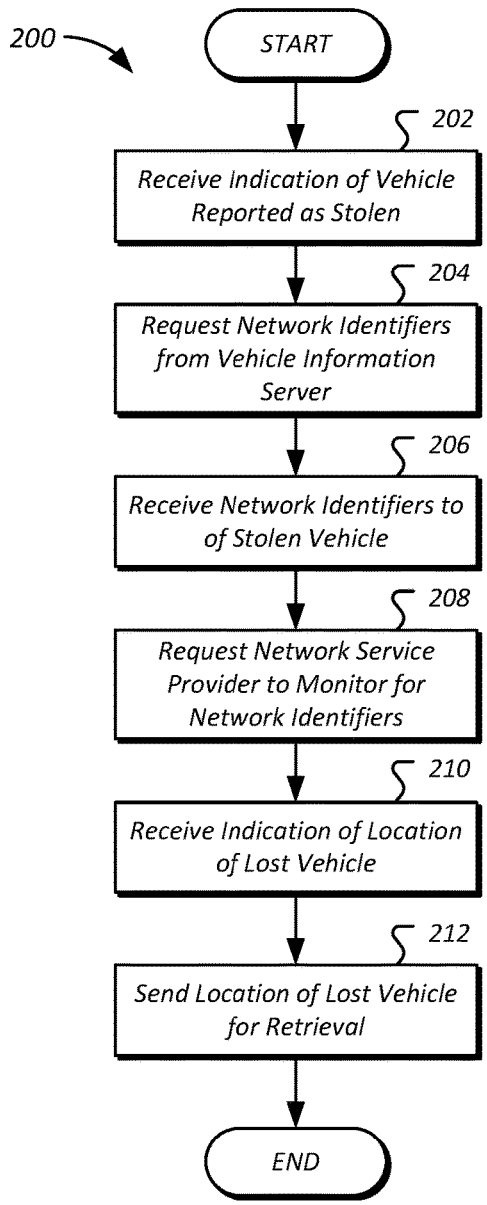
FIG. 2 illustrates an example flow diagram of the vehicle theft system processing indications of stolen vehicles.

FIG. 2 illustrates an example process 200 of the vehicle theft system 130 processing indications of stolen vehicles 102. The process 200 may be initiated at operation 202, responsive to the vehicle theft system 130 receiving an indication of the vehicle 102 having been reported as stolen.

At operation 204, the vehicle theft system 130 sends a message to the vehicle information server 124 requesting the network identifiers 116 that are associated with the vehicle identifier 126. At operation 206, the vehicle theft system 130 receives the network identifiers 116 of the vehicle 102 from the vehicle information server 124. Further aspects of the operation of the vehicle information server 124 are discussed below with respect to the process 300.

At operation 208, the vehicle theft system 130 requests that the service provider server 128 of the service provider network 118 monitor for the network identifiers 116 of the vehicle 102. At operation 210, the vehicle theft system 130 receives an indication of the location of the lost vehicle 102. Further aspects of the monitoring and location identification of the vehicle 102 are discussed below with respect to the process 400.

At operation 212, the vehicle theft system 130 sends the location of the lost vehicle 102 for retrieval. In an example, the vehicle theft system 130 may send the location of the lost vehicle 102 to law enforcement. In another example, the vehicle theft system 130 may send the location of the lost vehicle 102 to the owner of the vehicle 102. After operation 212, the process 200 ends.

Figure 3:
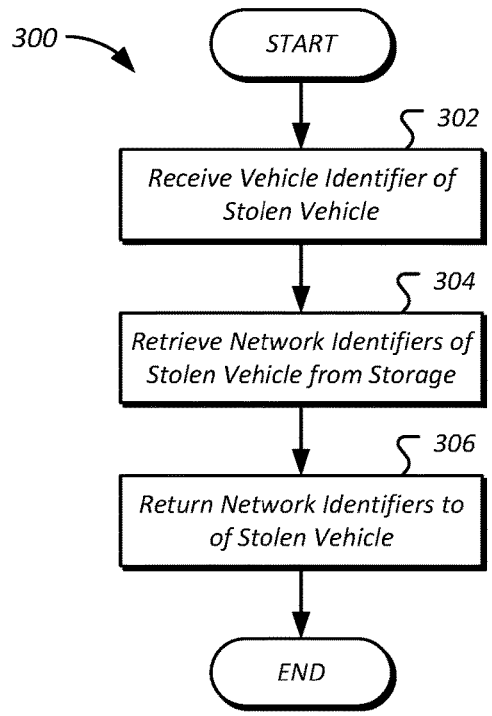
FIG. 3 illustrates an example process of the vehicle information server mapping vehicle identifiers to network identifiers.

FIG. 3 illustrates an example process 300 of the vehicle information server 124 mapping vehicle identifiers 126 to network identifiers 116. The process 300 may be initiated at operation 302, responsive to the vehicle information server 124 receiving a request to identify network identifiers 116 associated with a received vehicle identifier 126 of the stolen vehicle 102. In an example, the request may be received by the vehicle information server 124 from the vehicle theft system 130.

At operation 304, the vehicle information server 124 retrieves the network identifiers 116 that are associated with a received vehicle identifier 126 of the vehicle 102. In an example, the vehicle information server 124 accesses a data store mapping vehicle identifiers 126 to network identifiers 116 to retrieve the network identifiers 116 of the stolen vehicle 102. At operation 306, the vehicle information server 124 sends the retrieved network identifiers 116 back to the requester. In an example, responsive to the lookup, the vehicle information server 124 sends the network identifiers 116 to the vehicle theft system 130. After operation 306, the process 300 ends.

Figure 4:
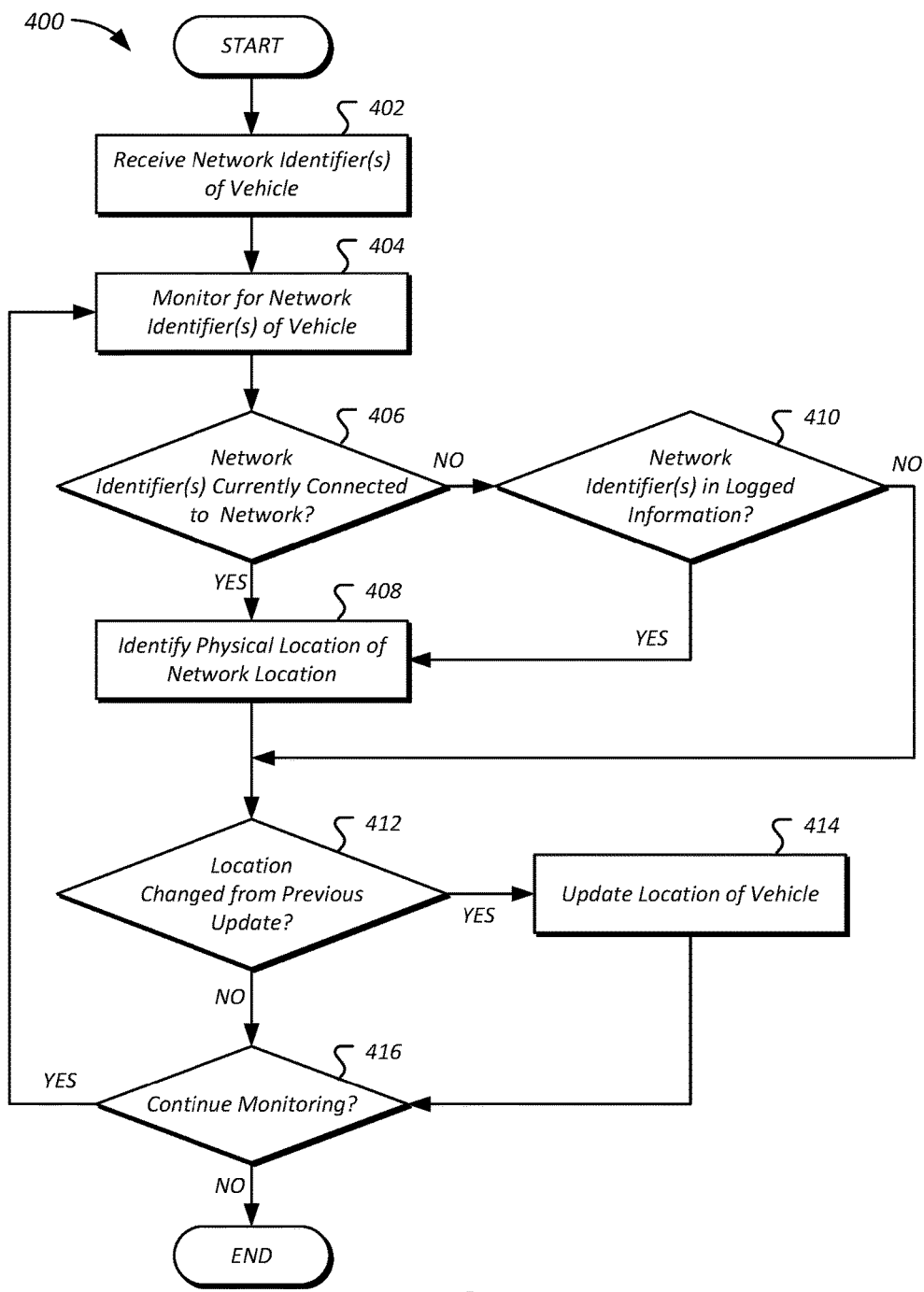
FIG. 4 illustrates an example process of the service provider server monitoring for network identifiers of stolen vehicles.

FIG. 4 illustrates an example process 400 of the service provider server 128 monitoring for network identifiers 116 of stolen vehicles 102. The process 400 may be initiated at operation 202, responsive to the service provider server 128 receiving network identifiers 116 of vehicles 102 to monitor for presence on the service provider network 118. In an example, the service provider server 128 may receive an indication of network identifiers 116 of a stolen vehicle 102. The indication may be received by the service provider server 128 from the vehicle theft system 130. In an example, the service provider server 128 may add the received network identifiers 116 to the stolen vehicle identifiers list 132.

At operation 404, the service provider server 128 monitors the service provider network 118 to detect whether any of the network identifiers 116 of stolen vehicle 102 are seen by components of the service provider network 118. In an example, the service provider server 128 may log or otherwise monitor usage of the service provider network 118 according to network identifiers 116 such as ICCID and/or MAC address. For instance, the service provider server 128 may check the logged or monitored data to determine what network devices, if any, have seen traffic from any of the devices on the listing of devices to monitor. Additionally or alternately, the service provider server 128 may provide the stolen vehicle identifiers list 132 to cellular towers, routers, or other network devices in the service provider network 118 to allow those devices to monitor for the stolen vehicle 102.

At operation 406, the service provider server 128 determines whether any of the network identifiers 116 of the stolen vehicle identifiers list 132 are currently or recently seen as connected to the service provider network 118. In an example, the service provider server 128 may observe the recently logged usage information to identify whether any of the listed network identifiers 116 have connected to or used the service provider network 118. In another example, the service provider server 128 may actively receive an indication from other network devices monitoring for the stolen vehicle identifiers list 132 that one of the network identifiers 116 was seen. If one of the network identifiers 116 of the stolen vehicle 102 is seen, control passes to operation 408. If not, control passes to operation 410.

At operation 408, the service provider server 128 identifies the physical connection location of the network access of the stolen vehicle 102. In an example, the service provider server 128 may utilize a mapping of network components to geographic locations to identify the physical location of the access of the network identifiers 116 of stolen vehicle 102 to the service provider network 118. Using the mapping, the service provider server 128 may utilize the logged information regarding the network identifiers or part numbers of the network devices that have seen the network identifiers 116, and translate that information into a physical location at which the stolen vehicle 102 was located at the time that the access was recorded. After operation 408, control passes to operation 412.

At operation 410, the service provider server 128 identifies the last-seen connection location of the stolen vehicle 102. In an example, the service provider server 128 may analyze historical logged information to determine whether any of the network identifiers 116 on the stolen vehicle identifiers list 132 have been seen in historical network logs. If so, control passes to operation 408. If not, an unknown location is specified for the stole vehicle 102, and control passes to operation 412.

At operation 412, the service provider server 128 determines whether the location of the stolen vehicle 102 has changes since the previous location update. If so, control passes to operation 414 to send an update of the location of the stolen vehicle 102. Otherwise control passes to operation 416. In other examples, location updates may be provided by the service provider server 128 regardless of whether the location of the vehicle 102 has changed.

At operation 414, the service provider server 128 updates the vehicle theft system 130 of the location of the stolen vehicle 102. In an example, the service provider server 128 provides the identifier physical location of the access of the stolen vehicle 102 to the service provider network 118.

At operation 416, the service provider server 128 determines whether to continue monitoring for the stolen vehicle 102. For instance, if the stolen vehicle 102 is located or if monitoring is no longer desired, the service provider server 128 may receive a message from the vehicle theft system 130 indicating that one or more network identifiers 116 should no longer be monitored. If so, control passes to operation 404. Otherwise, the process 400 ends.

Computing devices described herein, such as the ECUs 104, communications components 108, mobile devices 110, vehicle information server 124, service provider server 128, and vehicle theft system 130, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a vehicle information server mapping a unique identifier of a stolen vehicle to a network identifier of the stolen vehicle; and
a service provider server of a service provider network, programmed to, responsive to receiving a message from a vehicle theft system initiating monitoring for the network identifier and identifying access of the network identifier to a network device of the network, indicate a physical location of the network device and a time of access of the vehicle to the network device.

2. The system of claim 1, wherein the service provider server maintains a mapping of network locations to physical locations, and the service provider server is programmed to utilize the mapping to translate a network address of the network device to the physical location of the network device.

3. The system of claim 1, wherein the service provider server maintains a log of historical network usage, and the service provider server is further programmed to access the log of historical network usage to identify a second network device of the network to which the stolen vehicle was previously connected, and indicate a physical location of the second network device and a time of the access to a vehicle theft system.

4. The system of claim 1, wherein the network identifier is an integrated circuit card identifier (ICCID) of a subscriber identity module (SIM) of an embedded modem utilized by a telematics control unit of the vehicle to communicate over the network.

5. The system of claim 1, wherein the network identifier is a media access control (MAC) address network identifier of an accessory protocol interface module controller utilized by the vehicle to communicate over the network through use of a mobile device connected to the accessory protocol interface module controller over a local area connection.

6. The system of claim 1, wherein the service provider server is further programmed to:
initiate monitoring for the network identifier responsive to receiving a message from a vehicle theft system requesting initiation of the monitoring; and
indicate the physical location and the time of access to the vehicle theft system.

7. The system of claim 6, wherein the service provider server is further programmed to discontinue monitoring for the network identifier responsive to receiving a message from the vehicle theft system requesting termination of the monitoring.

8. A method comprising:
responsive to receiving a message from a vehicle theft system, initiating monitoring for a network identifier corresponding to a unique vehicle identifier of a stolen vehicle;
identifying access of the network identifier to a network device of the network; and
utilizing a mapping of network locations to physical locations to translate a network location of the network device to the physical location of the network device.

9. The method of claim 8, further comprising determining the network identifier according to a mapping of unique vehicle identifiers to network identifiers maintained by a vehicle information server.

10. The method of claim 8, further comprising updating the vehicle theft system with the physical location of the network device to indicate an approximate location of the stolen vehicle.

11. The method of claim 10, further comprising:
continuing the monitoring for the network identifier;
identifying a second access of the network identifier to a second network device of the network;
utilizing the mapping of network locations to physical locations to translate a network location of the second network device to a physical location of the second network device; and
updating the vehicle theft system with the physical location of the second network device.

12. The method of claim 8, wherein the network identifier is an integrated circuit card identifier (ICCID) of a subscriber identity module (SIM) of an embedded modem utilized by a telematics control unit of the vehicle to communicate over the network.

13. The method of claim 8, wherein the network identifier is a media access control (MAC) address network identifier of an accessory protocol interface module controller utilized by the vehicle to communicate over the network through use of a mobile device connected to the accessory protocol interface module controller over a local area connection.

14. The method of claim 8, further comprising discontinuing monitoring for the network identifier responsive to receiving a second message from a vehicle theft system.

15. The method of claim 8, further comprising:
receiving an indication including the unique vehicle identifier indicating that the stolen vehicle is to be monitored; and
receiving the network identifier from a vehicle information server responsive to sending the unique vehicle identifier to the vehicle information server.

16. A non-transitory computer-readable medium comprising instructions that, when executed by a processor, cause the processor to:
receive an indication including a unique vehicle identifier from a vehicle theft system, the indication specifying that a stolen vehicle corresponding to the unique vehicle identifier is to be monitored;
map the unique vehicle identifier to one or more network identifiers using a vehicle information server storing an association of unique identifiers of vehicles to network identifiers of vehicles;
identify one or more of the network identifiers as having accessed a communications network; and
utilize a mapping of network locations to physical locations to translate network locations of the network accesses to physical locations of the stolen vehicle.

17. The medium of claim 16, further comprising instructions that, when executed by the processor, cause the processor to discontinue monitoring for the network identifier responsive to receiving a stop message from the vehicle theft system.

18. The medium of claim 16, wherein the one or more network identifiers include an integrated circuit card identifier (ICCID) of a subscriber identity module (SIM) of an embedded modem utilized by a telematics control unit of the vehicle to communicate over the network.

19. The medium of claim 16, wherein the one or more network identifiers include a media access control (MAC) address network identifier of an accessory protocol interface module controller utilized by the vehicle to communicate over the network though use of a mobile device connected to the accessory protocol interface module controller over a local area connection.

* * * * *